United States Patent Office 2,801,322
Patented July 30, 1957

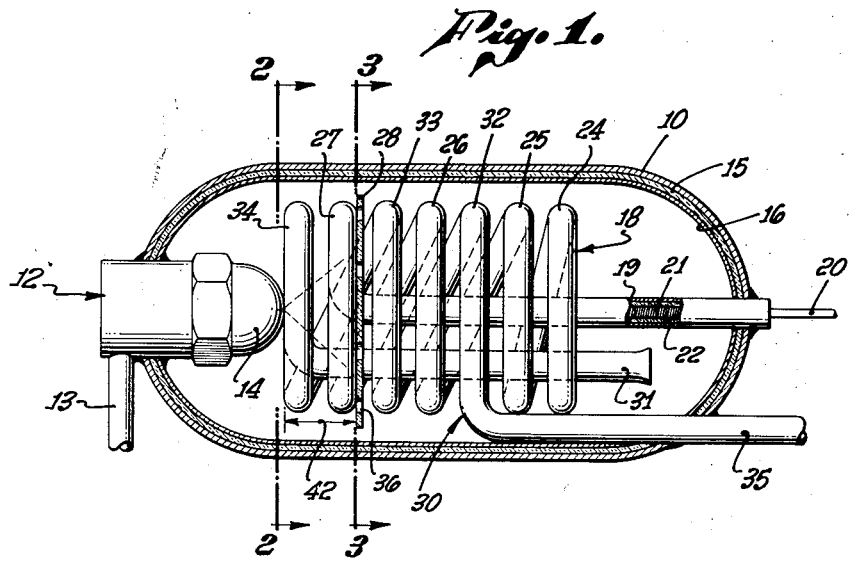

2,801,322

DECOMPOSITION CHAMBER FOR MONO-PROPELLANT FUEL

William T. Weatherill, Los Angeles, Calif., assignor to American Machine & Foundry Company, a corporation of New Jersey Application December 27, 1955, Serial No. 555,591

5 Claims. (Cl. 219—39)

This invention relates to fuel decomposition chambers and more particularly to the decomposition chambers which are provided with electrical heating elements capable of electrical preheating of the fuel only during the initial starting period in the operating cycle of the chamber and having a heat exchanger for maintaining the decomposition reaction thereafter.

It is known to the prior art to have decomposition chambers with electrical heating elements which are connected to the source of electric power throughout the operating cycle of the chamber. In the chambers of this type, the chamber includes an outer shell generally made of stainless steel, some heat-insulating means and an inner silver lining to inhibit the formation of carbon. Chambers of this type also include a nozzle for introducing a monopropellant, such as ethylene oxide, which upon heating to a temperature of approximately 1050° F. decomposes into carbon monoxide and methane. The decomposition reaction is an exothermic reaction, and, therefore, once it is properly initiated, it can sustain itself under proper conditions, such as the rate of heat supply by the electric heater. In the prior art chambers for monopropellant fuels, proper physico-chemical conditions prevail because the amount of heat supplied by the electric heater can be always adjusted to proper value. However, there are applications for the decomposition chambers of the above type in which the electric heater cannot be used throughout the entire period of the operating cycle of the chamber but can be used only for the initiation of the reaction whereupon it must be disconnected from the source of power because such power is no longer available for the reasons which need not be discussed here.

The invention discloses a decomposition chamber having an electric heater for starting the reaction and a heat exchanger for maintaining such reaction after the electric heater is disconnected. It includes an outer shell provided with a nozzle for introducing the monopropellant into the chamber, an electric heater coil for initiating the reaction, and the heat exchanger coil within the chamber in an interwoven relationship with the electric coil. The exothermic reaction is started by the electric heater coil, this coil being connected to a source of electric power at the time of the initiation of the reaction. After the initiation of the reaction, the source of electric power is disconnected and the reaction is made self-sustaining by the utilization of the heat produced by the reaction itself in a heat exchanger coil. The electric heater has a form of a helical spiral provided with a baffle plate which divides the internal volume of the decomposition chamber into two volumes. The first volume will be called here the predecomposition volume, while the second volume will be called a decomposition volume. The meaning of these two terms is as follows: In the predecomposition volume the liquid monopropellant, such as ethylene oxide, is evaporated and converted into vapor and some percentage of the vaporized monopropellant decomposes by following the previously mentioned exothermic reaction. All of the monopropellant passes through the baffle whereupon more heat is supplied to the vapor by the electric heater coil, and later, after the heater coil is disconnected, the heat is supplied by the heat exchanger coil which represents a hollow tube interwoven with the turns of the electric heater. By far the largest portion of the now evaporated fuel is decomposed into carbon dioxide and methane within the decomposition volume. That portion of the monopropellant which is burned in the predecomposition volume also passes through the baffle and that portion of the heat that becomes available is utilized in the decomposition volume for supplying heat to the monopropellant which decomposes in the decomposition volume portion of the chamber. The heat exchanger coil is supplied with an intake pipe which is open at that end of the decomposition chamber which is farthest away from the fuel nozzle. The gases produced by the monopropellant enter this pipe and circulate around the coil of the heat exchanger and then are exhausted through an exhaust tube which passes through the wall of the decomposition chamber. The heat exchanger coil is so constructed that the very first turn of the coil is adjacent to the fuel nozzle so that the hottest coil in the heat exchanger is positioned directly adjacent to the nozzle where liquid monopropellant enters the chamber. Such geometry of heat exchanger enables one to supply maximum amount of heat to the liquid monopropellant immediately upon its entry into the chamber. This is necessary because maximum amount of heat must be supplied at this point for supplying the heat of evaporation of the monopropellant. The heat exchanger coil is maintained at a temperature of approximately 1700° F. by the heat generated by the exothermic reaction. Accordingly, the decomposition chamber is capable of maintaining the above exothermic reaction even after the electric heater is disconnected from the source of electric power and when the ambient temperature is as low as —70° F. Stated differently, the chamber is constructed so that the reaction becomes a self-sustaining reaction even when the temperature of ambient air is as low as —70° F.

It is, therefore, an object of this invention to provide a decomposition chamber for a monopropellant fuel, including an electric heater and a heat exchanger, the electric heater being used for initiating a decomposition reaction in the fuel and the heat exchanger being used for sustaining this reaction after the electric heater coil is disconnected.

Still another object of this invention is to provide a decomposition chamber for a monopropellant fuel which is capable of maintaining an exothermic reaction of the fuel without any external source of heat.

An additional object of this invention is to provide a decomposition chamber having an outer insulated shell, a nozzle for introducing the monopropellant fuel into the chamber, an electric heater coil within the chamber and a heat exchanger coil interwoven with the electric heater coil for maintaining the exothermic reaction of the monopropellant fuel once it is initiated by the heat supplied by the heater coil.

The various objects and features of my invention will be fully understood from the following detailed description of a typical preferred form and application of the invention, reference being made throughout the description to the accompanying drawings. It should be understood that the description and the drawings do not constitute the limitations of this invention, the features which are believed to be novel and patentable being defined in the appended claims.

Referring to the drawings: Figure 1 is a vertical longitudinal section of the chamber.

Figure 2 is a vertical transverse section of the chamber taken along line 2—2 illustrated in Figure 1.

Figure 3 is a plan view of the baffle corresponding to the transverse sectional view taken along line 3—3 illustrated in Figure 1.

Referring to the drawings, the chamber comprises a stainless steel outer shell 10, having the shape of a hollow cylinder, the two ends of which are closed by two hemispherically shaped walls. The left hemispherical portion, as viewed in Figure 1 is provided with a fuel nozzle 12, having a fuel inlet pipe 13, and an injector 14, which sprays the monopropellant fuel in a form of a very fine spray into the decomposition chamber. It is a hollow cone type of spray nozzle. The spray angle of the cone is of the order of 80°. Spray nozzles of this type are known in the art and a suitable nozzle for the purpose at hand is a "Monarch" injector nozzle which is known as Type PLP, Series F–80, spraying 10.5 gallons per hour. The type of nozzle may vary in accordance with the rate of decomposition and rate of gas flow that is desired in any given case. The nozzle is welded to the outer stainless steel wall 10, of the chamber so as to make a gas-tight joint with the chamber. The chamber is also provided with an inner heat insulating lining 15. A suitable material for such heat insulating lining is asbestos. The chamber is also provided with an inner silver lining 16, for inhibiting the formation of carbon within the chamber. It should be mentioned here that when such monopropellant as ethylene oxide is used, it also includes a small percentage of carbon disulphide which acts as a carbon inhibiter in the mixture. Other carbon inhibiters are also used in the mixtures of this type. The electrical heater coil 18, includes an outer jacket 19, an outer conductor 20, an inner coil 21, and an insulating packing 22 which insulates the heater coil 21 from jacket 19. The heater coil has several turns; as illustrated in Fig. 1, it has three turns, 24, 25 and 26 on the right side of the baffle and a single turn 27, directly adjacent to the left side of the baffle plate 28, which is fastened to the last heater turn 27, so as to receive heat by direct conduction of heat from the metal jacket 19, to the metal baffle plate 28. The heater coil 18, is of conventional type known in trade as "Calrod" coil made by General Electric Company of Schenectady, New York.

The heat exchanger 30, includes a horizontal intake tube 31, and a plurality of turns, the turns 32 and 33 being positioned to the right of baffle 28, and a single turn 34, being positioned to the left of the baffle 28. In this specific configuration illustrated in the drawings, there is a total of four turns for the electric heater coil and three turns in the heat exchanger. The illustrated chamber is capable of sustaining the exothermic reaction when the rate of flow is in the order of .02 pound per second. The above rate of flow may be increased to approximately .03 pound per second. The dimensions of the chamber are also indicated in the drawing in terms of its overall length and the spacing of the baffle from the tip of the nozzle. The chamber may be designed to operate within the pressure range of the order of 1400 pounds per square inch as a maximum pressure, the minimum pressure being the order of 400 pounds per square inch. The heat exchanger coil 30, is made of stainless steel and it has an outside diameter of 3/16 inch and a wall thickness of .028 inch in one specific embodiment. It should be noted that all the turns of the heater coil and of the heat exchanger are spaced from each other with the heat exchanger coils being interwoven with the heater coils in the manner indicated in the figure. The above configuration permits free circulation of hot gases within the chamber and between the coils, which is essential for proper functioning of the chamber.

In the embodiment illustrated in the drawings, the baffle plate 28 is provided with a plurality of orifices 36 which comprise two rings, the diameter of the outer ring 38 being approximately equal to the outer diameter of the heat exchanger coil 27, while the diameter of the inner ring 40, is 5/8 inch and is smaller than the inner diameter of the heat exchanger coil 27. The outer ring has nine openings while the inner ring has six openings. The total number of openings should be proportioned so as to produce complete vaporization of the monopropellant fuel upon its passing through the baffle plate 28. The outer diameter of the baffle is equal to 1.75 inches while the inner diameter of the silver lining 16 is 2.0 inches so that the baffle forms a gap of .125 inch between the baffle and the silver lining. This gap is primarily desirable for fabrication purposes. The outside diameter of the heater coil is .165 inch and the coil is rated as a 400 watt coil, 55 watts per square inch capacity. The dimensions and the wattage ratings of the heater coil primarily are determined by the initial warm-up period. The shorter the initial warm-up period the higher the power and watt requirements.

One of the important dimensions of the decomposition chamber is the dimension 42 between the tip of the nozzle and that surface of the baffle plate 28, which faces the nozzle. In the disclosed chamber, this dimension is equal to 0.5 inch. This dimension is a critical dimension because it determines whether or not the pressure generated within the chamber is a steady pressure or an oscillatory pressure. If the baffle plate is moved closer to the nozzle, the oscillatory pressures assume the form of a sinuous wave having a moderate amplitude. If the baffle is moved further away from the tip of the nozzle, then the pressure assumes the form of peaked waves which indicate that the pressure has violent oscillations. The proper position of the baffles can be determined by purely experimental methods.

The operation of the disclosed chamber is as follows: The conductor 20, and the grounded outer conductor 19 of the heater coil are connected to a source of electric power, such as 115 volt A. C. or D. C. The coil is preheated for a period of approximately two minutes at which time it reaches a temperature of 2000° F. Such preheating of the electric heater coil also heats the inner silver lining, 16, to a temperature of approximately 800° F. and it also heats the heat exchanger coil to approximately 800° F. Upon reaching the above temperatures, the electric power is disconnected and an amount of propellant fuel, such as ethylene oxide, is introduced into the chamber by means of a spray nozzle 14, which sprays this fuel into the predecomposition volume of the chamber in a form of a fine spray. With the nozzle specified previously, the fuel is introduced at a pressure of approximately 800 pounds per square inch at the fuel inlet pipe 13, which creates a pressure of 700 pounds per square inch within the chamber. The sprayed fuel is vaporized and partially decomposed within the predecomposition volume whereupon it leaves the predecomposition volume through the orifices 36 of the baffle plate 28, and is completely decomposed in the decomposition volume portion of the chamber. Upon being decomposed in this manner, the fuel enters by inlet tube 31, of the heat exchanger coil, travels through the heat exchanger coil and leaves through the output tube 35, of the heat exchanger coil which leads to any consumer of the hot gases generated within the chamber. Such suitable consumer may be a wheel of an impulse turbine. In such cases, tube 35 is connected to an appropriate nozzle for proper introduction of the hot gases into the turbine.

The dimensions of the chamber and of the electrical heater coil given previously are governed by the amount of heat that is made available by the heater coil for initiating the exothermic reaction. The coil should possess sufficient calorific inertia so as not to be cooled off to an excessively low temperature so as to stop the decomposition reaction. The number of turns in the heat exchanger is also governed by the same considerations. It should be noted that the heat exchanger coil 34, which is the first coil of the heat exchanger, is positioned directly in front of the spray nozzle 14, so as to present the hottest source of heat to the liquid monopropellant entering the chamber. Accordingly, coil 34, which has the highest temperature is capable of furnishing the hottest surface where the greatest amount of heat is necessary for supplying the heat of vaporization to the monopropellant.

Outstanding features of the disclosed chamber reside in the fact that it can be operated at such low ambient temperatures as −75° F. This is made possible by the introduction of the heat exchanger coil 30. If the heat exchanger coil is removed, the disclosed decomposition chamber will cease functioning at approximately −20° F.

I claim:

1. A hollow decomposition chamber comprising an outer shell defining the inner volume of said chamber, nozzle means for spraying a monopropellant fuel into the hollow portion of said chamber and said inner volume, an electrical heater coil within the inner volume of said chamber and a hollow heat exchanger coil within the inner volume of said chamber, said heat exchanger coil being interwoven with said electrical heater coil and having an inlet tube within said chamber and an outlet tube for conducting gases away from said chamber, said heater and exchanger coils being held in spaced relationship with respect to said shell whereby said fuel is free to circulate between said coils.

2. A decomposition chamber comprising an outer shell, nozzle means for introducing a monopropellant fuel into said chamber, an electrical heater coil within said chamber, electrical heater coil including a baffle plate dividing said chamber into a predecomposition volume adjacent to said means and a decomposition volume on the other said of said baffle plate, a heat exchanger coil interwoven with said electrical heater coil, said heat exchanger coil having an inlet tube, including an open end, said open end being placed within said decomposition volume, said heat exchanger coil also having an outlet tube for conducting gases away from said chamber.

3. The decomposition chamber as defined in claim 2 in which said heat exchanger coil and said electrical heater coil each include at least one turn positioned within said predecomposition volume.

4. A decomposition chamber as defined in claim 2 in which said heat exchanger coil includes at least four turns, one of said turns being adjacent to said nozzle.

5. A decomposition chamber comprising an outer shell defining an inner, hollow chamber, nozzle means for introducing a fuel into said chamber, a helical electrical heater coil in said chamber in a suspended relationship with respect to said chamber; a hollow, helical heat exchanger coil interwoven with said electrical coil with the exchanger coil turns interlacing the electrical coil, a baffle dividing said chamber into first and second parts, the first part being adjacent to said nozzle and the second part being the remaining portion of said chamber, said second part being located on the other side of said baffle, said baffle having a plurality of perforations for conveying said fuel from the first part to the second part of the chamber, some of the coil turns of the electrical and heat exchanger coils being located in the first part of the chamber and the remaining turns in the second part of the chamber, said heat exchanger coil having an open input end located in said second chamber, and an output end located outside said shell and said chamber.

References Cited in the file of this patent
UNITED STATES PATENTS

| | | |
|---|---|---|
| 1,657,144 | Armstrong | Jan. 24, 1928 |
| 1,707,453 | Winograd | Apr. 2, 1929 |
| 2,097,581 | Beyrodt | Nov. 2, 1937 |
| 2,175,307 | Peck | Oct. 10, 1939 |